(12) United States Patent
Ikonomov

(10) Patent No.: US 11,176,561 B2
(45) Date of Patent: Nov. 16, 2021

(54) METHOD FOR CHECKING THE AUTHENTICITY OF GOODS OR SERVICES

(71) Applicant: Artashes Valeryevich Ikonomov, Moscow (RU)

(72) Inventor: Artashes Valeryevich Ikonomov, Moscow (RU)

(*) Notice: Subject to any disclaimer, the term of this patent is extended or adjusted under 35 U.S.C. 154(b) by 286 days.

(21) Appl. No.: 16/486,580

(22) PCT Filed: May 11, 2018

(86) PCT No.: PCT/RU2018/050050
§ 371 (c)(1),
(2) Date: Aug. 16, 2019

(87) PCT Pub. No.: WO2018/208190
PCT Pub. Date: Nov. 15, 2018

(65) Prior Publication Data
US 2021/0287227 A1    Sep. 16, 2021

(30) Foreign Application Priority Data
May 12, 2017 (RU) .......................... RU2017116702

(51) Int. Cl.
G06Q 99/00 (2006.01)
G06Q 30/00 (2012.01)
G06K 7/14 (2006.01)

(52) U.S. Cl.
CPC ......... *G06Q 30/018* (2013.01); *G06K 7/1413* (2013.01); *G06K 7/1417* (2013.01)

(58) Field of Classification Search
CPC ... G06Q 30/019; G06K 7/1413; G06K 7/1417
(Continued)

(56) References Cited

U.S. PATENT DOCUMENTS

| 8,671,062 B2 | 3/2014 | Sager et al. |
| 9,208,494 B2 | 12/2015 | Cibor |

(Continued)

FOREIGN PATENT DOCUMENTS

| EA | 011327 B1 | 2/2009 |
| EA | 013452 B1 | 4/2010 |

(Continued)

OTHER PUBLICATIONS

"Immersion in Blockchain Technology: Fight Against Counterfeit Goods", http://buyidentity.ru/, published in 2016; https://habrahabr.ru/company/mircrosoft/blog/312054, published on Dec. 19, 2016; with English machine translation (total 17 pages); cited in the Specification.

(Continued)

*Primary Examiner* — Ahshik Kim
(74) *Attorney, Agent, or Firm* — Seckel IP, PLLC

(57) ABSTRACT

This invention relates to methods for checking the authenticity of goods or services, in which a life cycle is divided into stages, a new unique tracking code is generated, and each such tracking code is associated with information in an integrated database of all of the goods and services. According to the invention, a list of user access parameters is generated, and the integrated database is divided into areas corresponding to different user access parameters, to each of which users having defined access rights have access. For each user, a user identification code corresponding to said user's access parameter is generated. For transfer of data into the integrated database, the user identification code is checked. In the event of correspondence, the user is allowed access. The technical result which is achieved is that of providing the possibility of limiting access to an integrated database of all of the goods and services for users having various access rights.

6 Claims, 2 Drawing Sheets

(58) Field of Classification Search
USPC .......................................................... 705/317
See application file for complete search history.

(56) References Cited

U.S. PATENT DOCUMENTS

| | | | |
|---|---|---|---|
| 9,619,760 B2 | 4/2017 | Dlott et al. | |
| 10,127,247 B1* | 11/2018 | Arora | .................... G06F 16/583 |
| 10,809,696 B1* | 10/2020 | Principato | ............ G06K 7/1417 |
| 2003/0163396 A1* | 8/2003 | Blankevoort | ........ G06Q 10/087 |
| | | | 705/28 |
| 2004/0139075 A1 | 7/2004 | Brodersen et al. | |
| 2005/0198329 A1 | 9/2005 | Byrd et al. | |
| 2008/0046263 A1 | 2/2008 | Sager et al. | |
| 2012/0234908 A1 | 9/2012 | Wang et al. | |
| 2016/0098723 A1 | 4/2016 | Feeney | |
| 2016/0132704 A1 | 5/2016 | Engels et al. | |
| 2017/0124630 A1 | 5/2017 | Shin et al. | |
| 2020/0357004 A1* | 11/2020 | Rueda | .................... G06Q 30/01 |

FOREIGN PATENT DOCUMENTS

| | | |
|---|---|---|
| RU | 2 321 890 C1 | 4/2008 |
| RU | 2 643 503 C1 | 2/2018 |
| WO | 96/17284 A2 | 6/1996 |
| WO | 01/77787 A2 | 10/2001 |
| WO | 2012/128976 A2 | 9/2012 |

OTHER PUBLICATIONS

International Search Report and Written Opinion dated Oct. 4, 2018 issued in corresponding application No. PCT/RU2018/050050; w/ English partial translation and partial machine translation (16 pages).

* cited by examiner

METHOD FOR CHECKING THE AUTHENTICITY OF GOODS OR SERVICES

TECHNICAL FIELD OF INVENTION

The invention relates to methods for checking the authenticity of goods or services, in which a life cycle of goods and services is divided into stages, a new unique tracking code is generated at each stage of the life cycle, said code being applied to the goods or used to mark a document corresponding to a service, and each such tracking code is associated with information in an integrated database of all of the goods and services, such database comprising data on the parameters of a good or service both at each subsequent stage of the life cycle and all previous stages and located on a remote server.

This description uses the following terms and definitions:

Server—an electronic device that performs service functions at the client's request by providing access to specific resources. For the purpose of this description, the server is permanently connected to a unified network capable of transferring data to the server from client devices. The server can process these data and transfer the result of such processing back to the client device.

Unified network, and all connections between all modules and units comprise diverse topologies, configurations and arrangements of the internetwork connection components built so as to connect corporate, global and local computing network, that comprises, including but not limited to, conventional wired networks, wireless, satellite, optic and equivalent network solutions. Preferably, Internet is usually used as such unified network.

Personal user device—any type of a computing platform connectable to a network like the unified network and allowing interaction with applications. Typical examples of individual client devices include, without limitations, desktop and mobile personal computers, "smart" cellular phones (or smartphones), portable computers, including tablet computers, lightweight clients, workstations, non-smart terminals connected to an application server, and diverse arrangements and configurations of the same, i.e. both as physical devices designed to interact within communication systems and as virtual devices implemented on programmable computer devices and having a program interface to facilitate communication functions. Preferably, an example of such device is a smartphone (a smart cellular phone, or a cellular phone that comprises a computer device functionality) that has a touchscreen, or a tablet PC and similar devices such as smart watch, glasses, etc. Often such devices are portable or wearable, so that a user could carry it around.

Life cycle of goods and services is a sequence of stages in the existence of a good or a service over time, starting from creation, processing and up until sale or service rendering to the end consumer, including transportation, storage, repair and possible transfer of title.

Unique tracking code (good or service passport) is an alphanumeric or graphic or similar coding, e.g. a barcode, a OR code, that can function as a unique coded message readable by electronic devices and containing information about a good or a service. For example, such information may include: date of manufacture, composition, manufacturer, seller, or price.

User identification code is an alphanumeric or graphic or similar coding, e.g. a barcode, a QR code, that can function as a unique coded message readable by electronic devices and containing information about a person. For example, full name, date of birth, personal ID or other identification data, sex, registered residence, position, title or rank, status, access level, etc.

Blockchain (or chain of transaction blocks) is a chain of blocks formed by transaction data built in accordance to predefined rules and stored in a distributed database.

Means of payment—any of the means used for payment, such as money account, virtual money, etc.

PRIOR ART

Goods counterfeit is a very urgent issue today. There are methods of protection from counterfeit that consist in applying a scannable code to the goods, such code containing information about the good (or service), including manufacturer data, date of manufacture, etc. However, the real problem is that these data are not updated or visualized after any transfer of title to the goods, changes in its status or transfer to another stage of the manufacturing cycle.

There is no systematic governmental approach in controlling and preventing counterfeiting. Most people have difficulties in distinguishing between genuine and counterfeited goods. The quality of counterfeited goods keeps improving year after year. Counterfeiters are increasingly turning toward mass market goods in high demand from premium goods. There is a very long chain of agents and middlemen between the buyer and the manufacturer. It is impossible to know the true origin of any good on a store shelf.

These issues have been solved by an existing solution.

A known example of prior art is a method for checking the authenticity of goods or services, wherein:
  the life cycle of goods or services is divided into stages;
  a unique tracking code is generated at the first stage of the life cycle;
  said code is applied to a good or used to mark a document corresponding to a service;
  each such tracking code is associated with information in an integrated database of all of the goods and services, such database comprising data on the parameters of the good or service at the first stage of the life cycle;
  said database is located on a remote server;
  a new unique tracking code is generated at each subsequent stage of the life cycle, said code being applied to the good or used to mark the document corresponding to the service;
  each such tracking code is associated with information in the integrated database of all of the goods and services, such database comprising data on the parameters of the good or service both at each subsequent stage of the life cycle and all previous stages;
  the buyer of the good or the user of the service is granted access to the integrated database of all goods and services, wherein the buyer of the good or the user of the service sends the scanned unique tracking code by means of a personal client device to the remote server, then a signal corresponding to the verified information on the good or service is sent back to the personal client device of the buyer of the good or the user of the service.

This method is described on http://buyidentity.ru/, published in 2016, and the article titled "Diving Deep Into Blockchain: Fighting Counterfeit", published on https://habrahabr.ru/company/microsoft/blog/312054/ on Dec. 19, 2016.

The above method is the closest to the essence and the achieved technical result and is assumed herein as a prototype of the claimed invention.

A drawback of the prototype is that the integrated database of all goods and services comprises information on the parameters of the good or service at all stages of the life cycle starting from the first stage. However, the life cycles of different goods and services also differ, that is why different users with different access levels must be able to view a different set of information about the good at different times. The prototype does not allow for it, and that is the problem that this invention is designed to address.

Indeed, the buyer only needs to know the manufacturer, composition, dates and price of sale. He/she does not need to know, for instance, prime cost. However, prime cost is required to calculate taxes correctly, so this parameter must be made visible to a user with a tax agent status. Users with customs offers or border control status may be interested in compliance with border rules during shipment, but they do not require any other information from the integrated database of all goods and services.

Disclosure of the Invention.

The present invention relies on this novel observation with the primary aim to offer a method for checking the authenticity of goods or services that serves at least to mitigate one of the aforementioned drawbacks, namely, to provide a possibility of limiting access to the integrated database for users having various access rights, said objective being the claimed technical objective of the present invention.

For this purpose, the method comprises additional stages, wherein:
- a list of user access parameters is generated, such access parameters matched with various access rights to the integrated database of all of the goods and services;
- the integrated database of all of the goods and services is divided into areas corresponding to different user access parameters, to each of which users having defined access rights have access;
- for each user of the integrated database of all goods and services, a user identification code corresponding to said user's access parameter is generated, said code also registered in the integrated database of all goods and services;
- for transfer of data into the integrated database or during requests to the integrated database, the user identification code is checked;
- in the event of correspondence of the submitted user identification code to the code registered with the integrated database of all goods and services, the user is allowed access to the area corresponding to the user's access right; if the codes fail to match—access is not granted.

These useful features make it possible to assign a status or an access level to the integrated database data to each user, and therefore a user identification code can be generated, said code then can be processed automatically, and the user can get access only to the area corresponding to his/her access rights depending on the result of the code processing. The rest of the data are not visible to the user, so that he/she cannot add or edit information.

A version of the invention includes an user identification code generation as a graphic code.

This useful feature makes it possible to automatically identify any user's access level. The identification code data can be read automatically using a personal client device.

A version of the invention includes recording information on the users in the integrated database of all goods and services using blockchain technology.

This useful feature makes it possible to eliminate the possibility of altering or counterfeiting such information. The protection of a good or service is already implemented in this solution, but its weak point is user authorization. That is why encryption of user authorization data is proposed.

A version of the invention includes a generation of the areas of the integrated database of all goods and services, embedded into one another.

This useful feature makes it possible to employ a pyramid-shaped, hierarchical data access mode, when the user with the minimum access level has access to the smallest area of the integrated database of all goods and services, the user with the next access level has access to the data available to the user with the minimum access level plus to additional data, and so on. There is also the user who has access to all data in the integrated database of all goods and services. In essence, that is the topmost controlling governmental authority.

A version of the invention includes a generation of a unique sales code for the good or service that, when scanned by the user client device, activates automatic crediting of the buyer's account for the benefit of the seller's account.

This useful feature makes it possible to generate a graphic code that, when scanned by the user client device, activates automatic crediting of the buyer's account for the benefit of the seller's account, which serves to make payment more convenient and check the authenticity of the good or service using payment information.

Finally, a version of the invention includes a generation of a unique tracking code for a group of goods or services that allows to generate a single unique tracking code for a group of goods or services, when bundled together.

This useful feature makes it possible to check authenticity of a whole group of goods or service in a single action.

The combination of the essential features of the claimed invention is not known from the prior art for similar methods, therefore the invention possesses the required feature of novelty pertaining to the method. The solution is not apparent and the task is major and still unresolved, therefore, the above solution is not evident to those skilled in the art, and the invention possesses the required feature of inventive step.

BRIEF DESCRIPTION OF DRAWINGS

Other distinguishing features and advantages of the invention are readily apparent from the description below which includes but is not limited to the following features, with reference to the figures attached.

Figure 1:
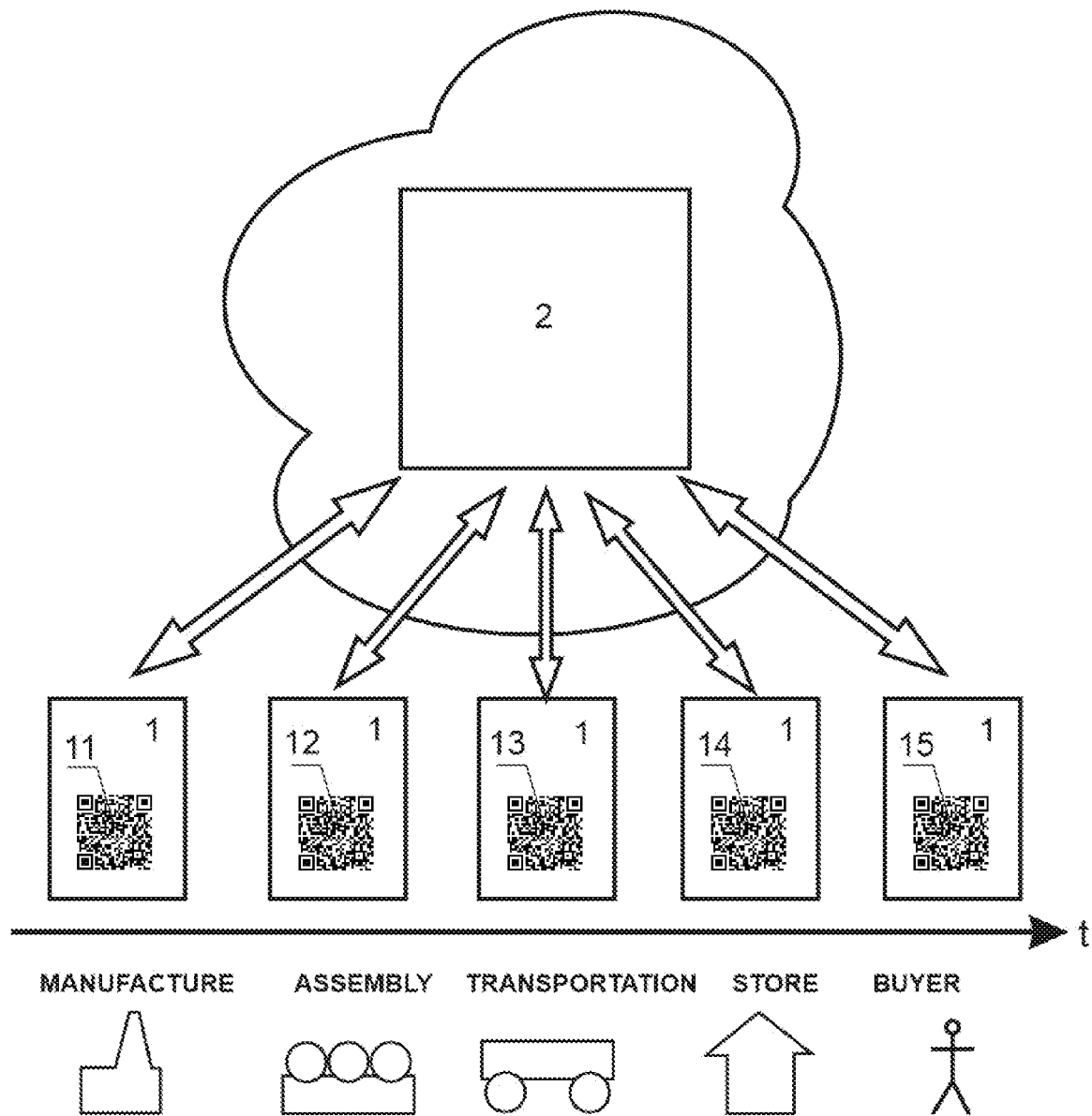
FIG. 1 represents a life cycle of goods or services based on the claimed method, according to prior art.

According to FIG. 1, the life cycle (see arrow marked with t) of goods or services is divided into stages. At a first stage of the life cycle, a unique tracking code 11 is generated, said code is applied to a good or used to mark a document corresponding to a service.

Each such tracking code 11 (at the first stage) is associated with an information in an integrated database 2 of all of the goods and services, such integrated database comprising data on the parameters of the good or the service at the first stage of the life cycle.

Said database 2 is located on a remote server or a plurality of servers (a distributed database).

A new unique tracking code 12, 13, 14 . . . is generated at each subsequent stage of the life cycle, said code being applied to the good or used to mark the document corresponding to the service.

Each new unique tracking code is associated with an information in the integrated database 2 of all of the goods and services, such database comprising data on the parameters of the goods or service both at each subsequent stage of the life cycle and all previous stages.

The buyer 31 of the good (or the user of the service) is granted access to the integrated database 2 of all goods and services, wherein the buyer of the good or the user of the service sends the scanned unique tracking code 11, 12, 13 . . . by means of a personal client device 41 to the remote server, or a plurality of servers, then a signal corresponding to the verified information on the good or service is sent back to the personal client device 41 of the buyer of the good or the user of the service.

A list of user access parameters is generated, such access parameters matched with various access rights to the integrated database of all of the goods and services.

Figure 2:
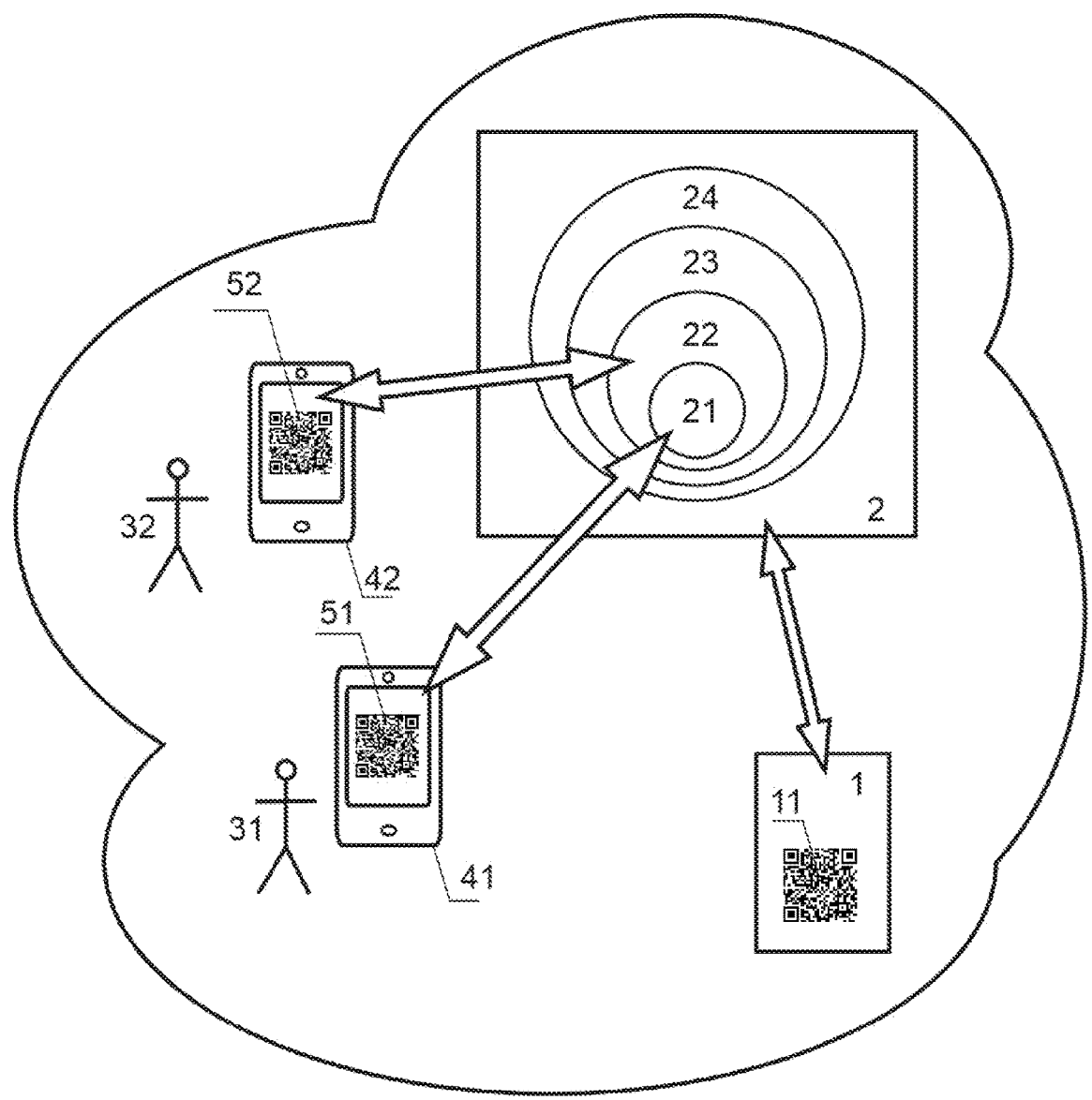
FIG. 2 represents a functional diagram of authenticity check of goods or services based on the proposed method, according to the invention.

The integrated database 2 of all of the goods and services is divided into areas 21, 22, 23, 24 . . . corresponding to different user access parameters, to each of which users having defined access rights have access, see FIG. 2.

For each user 31 of the integrated database 2 of all goods and services, a user identification code 51 corresponding to said user's access parameter is generated, said code also registered in the integrated database 2 of all goods and services. (FIG. 2 also shows another user 32 with code 52, etc.)

For transfer of data into the integrated database 2 or during requests to the integrated database 2, the user identification code 51 is checked.

In the event of correspondence of the submitted user identification code to the code registered with the integrated database of all goods and services, the user is allowed access to the area corresponding to the user's access right; if the codes fail to match—access is not granted.

FIGS. 1 and 2 show how the user identification code is generated as graphic code.

In general, all information (about the users and about goods and services) can be recorded in the integrated database of all goods and services using blockchain technology, so that it is tamper-proof.

Particularly, areas 21, 22, 23, 24 . . . of the integrated database 2 of all goods and services may be generated as embedded into one another to form access levels in series.

Another unique feature of this invention is the possibility to generate a unique sales code for the good or service that, when scanned by the user client device, activates automatic crediting of the buyer's account for the benefit of the seller's account. It is important that the fact of payment may be used as proof that the goods are genuine during later authenticity checks. In other words, the possibility of payment is not only a convenient option for the buyer, but also another method to check authenticity, as the payment is an additional verification channel which can be requested, if necessary, from a clearance company (mostly banks).

Furthermore, this unique sales code for the good or service may be used not only by the buyer but also at any stage of the life cycle of the good or service where payment is an option, for example, between manufacturers, suppliers or raw materials or intermediates and assemblers of a finished product.

Embodiment of the Invention

The method for checking the authenticity of goods or services functions as follows. The most exhaustive and non-limiting example of embodiment is provided.

Figure 3:
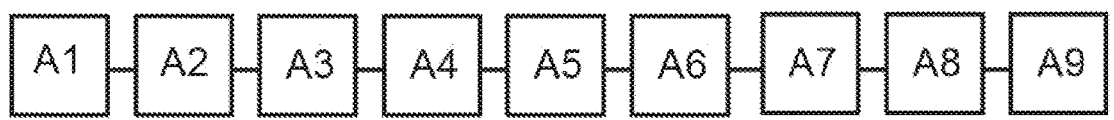
FIG. 3 represents a diagram showing the stages of the method for checking authenticity of goods or services, according to the invention.

According to FIG. 3:

Stage A1. At each stage of manufacture of the goods or services, a unique tracking code of the good or service (product ID) is generated as QR code or other graphic code (or based on another similar method of identification capable of generating physically visualizable information scannable by computer devices, e.g, mobile devices).

Stage A2. Each manufacturer of goods and services is registered on a remote server (or a plurality of servers) that comprises an integrated database of all goods and services. The manufacturer is assigned a mark or a user identification code (here—a manufacturer identification code). At the same time, the manufacturer can also have a user identification code for the purpose of buying raw materials and parts to manufacture goods and services, or for the purpose of verification, or as an individual buyer.

Stage A3. At each stage of the life cycle of the good or service, e.g, at each stage of the production chain, after the end of each phase, the process owner who has his/her own user identification code receives the good. At the same time, such process owner scans a unique tracking code of the good or service (ID) during the receipt, performs his/her part of work, and, when finished, creates a new ID using his/her mobile device or a dedicated terminal specifying the work data and end date. These data are uploaded on a remote server and recorded in the integrated database of all goods and services.

Stage A4. This new unique tracking code (ID) is printed and attached or applied using a special-purpose device, e.g. laser, onto the good or a document/specification for a service.

Stage A5. Then the next process owner downstream scans the new tracking code, which corresponds to the action "received" (specifying the receipt date), performs his/her work and, when finished, generates a new unique tracking code (which corresponds to "completed" action) and specifies the required parameters and date, said new code based on the previous code and comprising all information contained in the previous unique tracking code. Then the code is printed and attached to the obtained product.

Stage A6. The previous stages are repeated until the good is finished. Each scanning during receipt or completion means that information is uploaded to and received from the remote server hosting the integrated database of all goods and services.

For example, an employee responsible for packing scans the unique tracking code on the good received, which corresponds to "received" action, and packs it. Following that, another unique tracking code is generated and applied onto a good/document.

Stage A7. Then the buyer can scan the unique tracking code of the good or service using a mobile device. In this case, it may mean "completion" action, because all relevant parameters and dates are specified during generation of each unique tracking code or during each scanning.

If the unique tracking code is scanned by the buyer, not a fellow manufacturer, the buyer, following scanning the good and the delivery note (an invoice including all information relevant for purchase, e.g. price), can create a new unique sales code corresponding to the invoice attached to the buyer's banking account.

The buyer scans the unique sales code of the good or service and sends it to his/her bank so that the required amount could be withdrawn. The bank may issue a notice to the buyer to verify the transaction (to confirm it via encryption or signature, retina scan or code input), then the money is credited to the seller. This operation can be repeated multiple times, and the buyer can later operate as a seller.

Stage A8. If the goods have to be packed in a large package, the integrated database of all goods and services can combine the goods during scanning, which corresponds to the "received, quantity and date verified" action, and a unique tracking code for a group of goods or services can be generated after the goods are packed in a large package. This code is applied onto the package, e.g. onto the pallet, which corresponds to the "completion" action.

Then this package is received by the next user, e.g. a loader, an inspector or a warehouse keeper. He/she loads it on board the vehicle, generates a new unique tracking code for a group of goods or services to cover all products, prints out this new unique tracking code for a group of goods or services and attaches it, for example, onto the door of the truck or other vehicle.

The driver or forwarder scans this new unique tracking code for a group of goods or services to their device, which corresponds to the "received" action. Then the process of goods/services receipt, transportation, resale and storage can be repeated multiple times, if storage times are not specified in the datasheet, contract or specification in accordance with the bylaws of the relevant state or provisions of the contract. When the storage period expires or service is no longer relevant, the information in the integrated database of all goods and services on the remote server will have a flag showing that the goods/services are expired. When the unique tracking code for such good/service is scanned, the information is visible to the customer on the screen of the client device.

Stage A9. At any stage of the life cycle of a good or service, or at any stage of the production chain, goods and services can be controlled by any authorized user, for example, a production inspector, a border control officer, a customs officer, internal affairs officers, employees of other enforcement and special-purpose governmental authorities and institutions authorized to conduct checks and controls. Each controlling person has his/her own user identification code which is checked every time he/she accesses the integrated database. That is, during each check, a unique tracking code is scanned (with date and time of scanning specified), then the controlling person conducts the check and generates a new unique tracking code which is printed out with the previous unique tracking code (main product ID) and attached to the forwarder's vehicle door or on the goods proper, if the goods are a single article, on the factory or in the store warehouse. These actions are repeated further down the chain, wherein each controlling person scans the main unique tracking code, prints it out and attaches next to the code from the previous check and the main unique tracking code. Depending on the scope of authority, the controlling person will have all available information on the good or service at hand.

Various users have access to various areas of the integrated database of all goods and services. Individual buyers have access to the basic and most relevant information on the goods, or, the manufacturer, the date of manufacture, material, previous owner, repair or servicing data, etc. with dates.

The user with the tax agent status can function as a controlling person with access to relevant areas of the integrated database of all goods and services. However, he/she can also act as an individual buyer.

The higher is the access level, the more files will be available in the application, Access depends on the registration form.

Some information may be transferred automatically, to tax authorities or other federal authorities, if required.

Special services, special goods or special factories may be encrypted and moved to a restricted-access section of the integrated database of all goods and services, for example, they can be stored on a separate server or have additional encryption protection.

Special-purpose contactless reader devices may be used to read unique tracking codes in the form of, for example QR codes. It is convenient for the buyer of a good or service and for further payment.

Previously recorded information cannot be canceled. Only the information input after scanning and before registration in the integrated database of all goods and services can be canceled, i.e. before the graphic code is printed out. Making changes in the information before registration in the integrated database of all goods and services is only possible if the time frame for changes is set ahead of time, however, these changes do not override the information, but appear as additional information on top of previous information, so that all information that users enter will be visible, After the goods/services are received by a new buyer or user (forwarder or storage operator), no changes can be applied.

When the goods are returned, a new unique tracking code is generated at each stage by the person in charge of receipt. The information includes the fact of return, date and cause of return. Then either a new unique tracking code is generated for the returned goods, with previous unique tracking code, date of return and cause of return included, or a unique recycling code is generated.

With the contractor's consent, each process may be additionally encrypted by the manufacturer, if the process is sensitive for commercial or military reasons. It is made possible by the fact that each stage is encrypted. The process will only be visible to the manufacturer's representative or authorized personnel.

The sequence of stages is provided by way of example. Individual stages may be switched, removed, added or performed simultaneously without prejudice to the possibility to perform authenticity checks of the goods/services. It means that any set of particular stages can be performed either simultaneously, on their own or in any combination.

EXAMPLE 1

A check in a restaurant carries a QR code which, when scanned, gives the following information:
all information about the food ordered;
place and time of purchase, manufacture and manufacturing process;
how to pay for the restaurant services by a bank card tethered to the mobile device or using another account.

EXAMPLE 2

Goods bought in a store carry a QR code which, when scanned, gives the following information:
all information relevant to the customer, e.g. sequence of life cycle, or, optionally, sequence of payment transactions, storage, transportation, etc., how to pay for the goods by a bank card tethered to the mobile device or using another account.

EXAMPLE 3

A user who is a customs officer checks the goods and generates a unique code to mark goods cleared by customs. When scanned, the code shows that the goods were cleared by customs, the name of the officer, time of clearance and other relevant information.

EXAMPLE 4

Access level can be measured on a scale from 1 to 10, the higher the value, the higher is the access level to the information on goods and services. An individual user (buyer) has access level 1 and sees only the basic information. He/she downloads the application, registers in the integrated database of all goods and services with scanned information of his/her official ID or similar document. A user identification code is generated linking the system to the client device. When the application is activated, the client device activates the user identification code and a mark. When the user is identified, the database displays relevant information.

Each authority and company can create its user profiles. The database administrator gives access using a system of passwords to the administrators of these authorities and companies, so that they could use the system of passwords on their own to grant access to employees, Employees download the application to create their own user identification code with a mark. If a client device is lost, the employee or other user must report it and register again—then a new user identification code with a respective access level will be generated.

INDUSTRIAL APPLICABILITY

The claimed method for checking the authenticity of goods or services may be implemented by a person skilled in the art in practice and ensures that the claimed objectives are met after implementation, which leads to the conclusion that the invention meets the requirement of "industrial applicability".

According to the invention claimed, a prototype system for checking the authenticity of goods or services was manufactured, i.e. servers configured to support processing of all relevant data were tested.

Trial runs of the prototype demonstrated that it enables the following:

automatic distribution of user rights by access levels to the integrated database;

automatic check of user access parameters by means of their user identification codes;

payment for goods or services by scanning a unique sales code of a good or service with a client device for automatic buyer account crediting in favor of the seller.

Therefore, the invention serves to achieve the stated technical result, i.e. providing the possibility of limiting access to an integrated database of all of the goods and services for users having various access rights.

An additional useful technical result of the claimed invention is:

the method makes it possible to register and control the goods/services manufacturing process at each stage of the life cycle, starting from the initial manufacture up until final sale, including identification of the owner and all changes applied, i.e. servicing or repair, if the goods have no expiration date;

this method makes it possible to eliminate counterfeit, to know the provenance of the goods right from the date of manufacture. If the goods are stolen, it will appear in the integrated database of all of the goods and services as wanted;

controlling governmental authorities will have more accurate data on counterfeit goods to prevent them from entering the market and give certified transaction IDs to services, which is now impossible. The QR code pertaining to each services transaction will be stored on mobile devices to facilitate payment.

The invention claimed is:

1. A method for checking the authenticity of goods and/or services, comprising:

dividing a life cycle of goods and/or services into stages;

generating a unique tracking code at a first stage of the life cycle;

applying the unique tracking code to a good or using the unique tracking code to mark a document corresponding to a service;

associating the unique tracking code with information in an integrated database of all the goods and/or services, the database comprising data on parameters of the good or service at the first stage of the life cycle;

generating a new unique tracking code at each subsequent stage of the life cycle, the respective new unique tracking code being applied to the good or used to mark the document corresponding to the service;

associating each new unique tracking code with information in the integrated database of all the goods and/or services, the database comprising data on the parameters of the good or service at each subsequent stage of the life cycle and at all previous stages;

granting access to the buyer of the good or the user of the service to the integrated database of all the goods and/or services, wherein the buyer of the good or the user of the service sends the scanned unique tracking code using a personal client device to a remote server, then a signal corresponding to the verified information on the good or service is sent back to the personal client device of the buyer of the good or the user of the service, generating a list of user access parameters, the access parameters being matched with various access rights to the integrated database of all the goods and/or services;

dividing the integrated database of all the goods and/or services into areas corresponding to different user access parameters, wherein users having defined access rights have access to each of the areas;

generating, for each user of the integrated database of all goods and services, a user identification code corresponding to the user's access parameter, the code being also registered in the integrated database of all the goods and/or services;

checking the user identification code for transfer of data into the integrated database or during requests to the integrated database of all the goods and/or services;

in the event of correspondence between the user identification code to the code registered with the integrated database of all the goods and/or services, granting access to the user to the area or areas corresponding to the user's access right; and if the codes fail to match, denying access.

2. A method according to claim 1, wherein the user identification code is generated as a graphic code.

3. A method according to claim 1, wherein an information on the users is recorded in the integrated database of all the goods and/or services using blockchain technology.

4. A method according to claim 1, wherein the areas of the integrated database of all the goods and/or services are generated embedded into one another.

5. A method according to claim 1, further comprising a unique sales code for the good or service, wherein, when the unique sales code is scanned by the user client device, the unique sales code activates automatic crediting of the buyer's account for the benefit of the seller's account.

6. A method according to claim 1, wherein a unique tracking code is generated for a group of goods or services, wherein the unique tracking code allows to generate a single unique tracking code for a group of goods or services, when bundled together.

\* \* \* \* \*